United States Patent
Han et al.

(10) Patent No.: US 10,557,469 B2
(45) Date of Patent: Feb. 11, 2020

(54) MULTI-OUTLET FLUID FLOW SYSTEM FOR AN APPLIANCE INCORPORATING A BI-DIRECTIONAL MOTOR

(71) Applicant: WHIRLPOOL CORPORATION, Benton Harbor, MI (US)

(72) Inventors: Feiting Han, St. Joseph, MI (US); Qiang Mei, Stevensville, MI (US); Jinming Sun, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 715 days.

(21) Appl. No.: 15/076,987

(22) Filed: Mar. 22, 2016

(65) Prior Publication Data

US 2017/0276138 A1 Sep. 28, 2017

(51) Int. Cl.
| F04D 15/00 | (2006.01) |
| D06F 37/26 | (2006.01) |
| F04D 1/00 | (2006.01) |
| F04D 13/06 | (2006.01) |
| F04D 29/22 | (2006.01) |
| F04D 29/42 | (2006.01) |
| H02K 7/14 | (2006.01) |

(52) U.S. Cl.
CPC ......... *F04D 15/0027* (2013.01); *D06F 37/26* (2013.01); *F04D 1/00* (2013.01); *F04D 13/06* (2013.01); *F04D 29/22* (2013.01); *F04D 29/4293* (2013.01); *H02K 7/14* (2013.01)

(58) Field of Classification Search
CPC .... H02P 6/22; H02P 6/30; H02P 1/465; H02P 1/48; F04D 29/50; D06F 39/085
See application file for complete search history.

(56) References Cited

U.S. PATENT DOCUMENTS

| 772,989 | A | * | 10/1904 | Williams | ............... F04D 29/628 |
|   |   |   |   |   | 415/127 |
| 2,934,023 | A |   | 4/1960 | Lamkin et al. |   |
| 3,129,711 | A |   | 4/1964 | Schmitt-Matzen |   |
| 3,136,254 | A | * | 6/1964 | Douglas | ............... D06F 39/085 |
|   |   |   |   |   | 415/152.2 |
| 3,359,907 | A |   | 12/1967 | Bochan |   |
| 3,455,119 | A |   | 7/1969 | Bright |   |
| 3,587,939 | A | * | 6/1971 | Nystuen, et al. | ... A47L 15/4225 |
|   |   |   |   |   | 137/565.37 |

(Continued)

FOREIGN PATENT DOCUMENTS

| CH | 707892 | 10/2014 |
| CN | 202630562 | 12/2012 |

(Continued)

*Primary Examiner* — Christopher S Bobish
(74) *Attorney, Agent, or Firm* — Price Heneveld LLP (57) ABSTRACT

A drain pump for an appliance includes a single, self-starting, single-phase synchronous motor and a pump chamber having an inlet and first and second outlets. The first outlet is a drain outlet and the second outlet is a recirculation outlet. An impeller is disposed within the pump chamber and is selectively and bi-directionally driven by the single-phase synchronous motor. Rotation of the impeller in a first direction directs fluid from the inlet toward the drain outlet and away from the recirculation outlet. Rotation of the impeller in the second direction directs the fluid from the inlet toward the recirculation outlet and away from the drain outlet.

17 Claims, 8 Drawing Sheets

(56) References Cited

U.S. PATENT DOCUMENTS

| | | |
|---|---|---|
| 3,653,807 A | 4/1972 | Platt |
| 3,680,893 A | 8/1972 | Giraud |
| 3,751,179 A | 8/1973 | Wassmann |
| 3,773,432 A * | 11/1973 | Chow .................. F04D 29/506 415/203 |
| 3,836,001 A | 9/1974 | Heldreth |
| 3,896,641 A | 7/1975 | Worst |
| 3,953,146 A | 4/1976 | Sowards |
| 3,975,931 A | 8/1976 | Bischkopf |
| 4,068,870 A | 1/1978 | Whitney et al. |
| 4,251,758 A | 2/1981 | Pedersen et al. |
| 4,409,532 A | 10/1983 | Hollenbeck et al. |
| 4,451,069 A | 5/1984 | Melone |
| 4,600,361 A | 7/1986 | Bianco |
| 4,647,082 A | 3/1987 | Fournier et al. |
| 4,671,540 A | 6/1987 | Medvick et al. |
| 4,698,537 A * | 10/1987 | Byrne .................... H02K 1/246 310/168 |
| 4,804,213 A | 2/1989 | Guest |
| 4,865,517 A * | 9/1989 | Beehler ................ F04D 29/083 277/643 |
| 4,869,076 A * | 9/1989 | Sakai ........................ F25C 1/12 62/347 |
| 4,874,298 A * | 10/1989 | Mainardi ................ B60S 1/481 415/148 |
| 5,142,214 A | 8/1992 | Purson et al. |
| 5,173,651 A * | 12/1992 | Buckley ................ H02K 29/08 310/106 |
| 5,214,936 A | 6/1993 | Lim et al. |
| 5,285,664 A | 2/1994 | Chang et al. |
| 5,395,140 A | 3/1995 | Wiethorn |
| 5,486,089 A * | 1/1996 | Chung ................ F04D 15/0016 415/146 |
| 5,628,531 A | 5/1997 | Rosenberg et al. |
| 5,658,020 A | 8/1997 | Carman et al. |
| 5,740,835 A | 4/1998 | Murphy |
| 5,911,750 A | 6/1999 | Mandel et al. |
| 5,921,104 A | 7/1999 | Chang |
| 6,005,321 A * | 12/1999 | Bolton ................... H02K 1/246 310/167 |
| 6,070,419 A | 6/2000 | Chang |
| 6,114,827 A | 9/2000 | Alvaro |
| 6,159,962 A | 12/2000 | Steiner et al. |
| 6,239,563 B1 * | 5/2001 | Kunz ..................... H02P 1/465 318/400.07 |
| 6,574,979 B2 | 6/2003 | Faqih |
| 6,574,984 B1 | 6/2003 | McCrea et al. |
| 6,672,628 B2 | 1/2004 | Thomas et al. |
| 6,854,772 B2 | 2/2005 | Weller et al. |
| 6,863,314 B2 | 3/2005 | Guest |
| 6,913,294 B2 | 7/2005 | Treverton et al. |
| 7,316,428 B2 | 1/2008 | Takayanagi et al. |
| 7,458,171 B1 | 12/2008 | Lentz |
| 7,510,216 B2 | 3/2009 | Tomerlin et al. |
| 7,624,896 B2 | 12/2009 | Doglioni Majer |
| 7,707,860 B2 | 5/2010 | Hong et al. |
| 7,770,418 B2 | 8/2010 | Kramme et al. |
| 7,866,182 B2 | 1/2011 | Lim et al. |
| 7,967,573 B2 * | 6/2011 | Marioni .............. A47L 15/0047 318/700 |
| 8,029,024 B2 | 10/2011 | Guest |
| 8,083,104 B2 | 12/2011 | Roetker et al. |
| 8,164,286 B2 * | 4/2012 | Marioni .................. H02P 1/465 318/400.11 |
| 8,171,757 B2 | 5/2012 | Dahlke |
| 8,266,814 B2 | 9/2012 | Grunert |
| 8,499,978 B2 | 8/2013 | Dalchau et al. |
| 8,540,118 B2 | 9/2013 | McDonald et al. |
| 8,575,873 B2 * | 11/2013 | Peterson ................ H02P 27/04 318/400.11 |
| 8,656,731 B2 | 2/2014 | Kim |
| 8,695,371 B2 | 4/2014 | Boarman et al. |
| 8,789,854 B2 | 7/2014 | Christian, Jr. et al. |
| 8,926,275 B2 | 1/2015 | Badafem et al. |
| 8,991,220 B2 | 3/2015 | Buso et al. |
| 9,010,144 B2 | 4/2015 | Park et al. |
| 9,065,363 B2 | 6/2015 | Marioni |
| 9,088,236 B2 | 7/2015 | Marioni |
| 9,255,358 B2 | 2/2016 | Kim |
| 9,273,903 B2 | 3/2016 | Vian et al. |
| 9,309,103 B2 | 4/2016 | Ergican et al. |
| 9,373,210 B2 | 6/2016 | Wittern, Jr. et al. |
| 9,404,211 B2 | 8/2016 | Hill et al. |
| 9,506,682 B2 | 11/2016 | Yun et al. |
| 9,581,377 B2 | 2/2017 | Kim et al. |
| 9,617,680 B2 | 4/2017 | Kitayama et al. |
| 9,644,308 B2 | 5/2017 | Leibman et al. |
| 9,702,078 B2 | 7/2017 | Lee |
| 9,702,080 B2 | 7/2017 | Lee et al. |
| 9,809,922 B2 | 11/2017 | Salomonsson |
| 9,890,029 B2 | 2/2018 | Comsa et al. |
| 9,903,064 B2 | 2/2018 | Del Pos et al. |
| 9,915,468 B2 | 3/2018 | You et al. |
| 2006/0277690 A1 | 12/2006 | Pyo et al. |
| 2010/0253075 A1 | 10/2010 | Werth |
| 2012/0019180 A1 * | 1/2012 | Marioni .................. H02P 1/465 318/400.11 |
| 2012/0032629 A1 | 2/2012 | Peterson et al. |
| 2012/0104021 A1 | 5/2012 | Cur et al. |
| 2012/0114473 A1 | 5/2012 | Badafem et al. |
| 2012/0228871 A1 | 9/2012 | Li |
| 2012/0246960 A1 | 10/2012 | Lee et al. |
| 2013/0257043 A1 | 10/2013 | Guest |
| 2013/0318813 A1 | 12/2013 | Hong et al. |
| 2014/0013616 A1 | 1/2014 | Lee et al. |
| 2014/0283542 A1 | 9/2014 | Jang |
| 2015/0197417 A1 | 7/2015 | Stagg et al. |
| 2015/0225226 A1 | 8/2015 | You et al. |
| 2015/0345072 A1 | 12/2015 | Ko et al. |
| 2016/0010271 A1 | 1/2016 | Shin et al. |
| 2016/0083238 A1 | 3/2016 | Koo |
| 2016/0083894 A1 | 3/2016 | Bison et al. |
| 2016/0090681 A1 | 3/2016 | Nash et al. |
| 2016/0115643 A1 | 4/2016 | Bison et al. |
| 2016/0138209 A1 | 5/2016 | Kitayama et al. |
| 2016/0138849 A1 | 5/2016 | Lee et al. |
| 2016/0201985 A1 | 7/2016 | Lee et al. |
| 2016/0205988 A1 | 7/2016 | Bird et al. |
| 2016/0341462 A1 | 11/2016 | Kim |
| 2017/0037560 A1 | 2/2017 | Shin et al. |
| 2017/0051449 A1 | 2/2017 | Nam et al. |
| 2017/0059224 A1 | 3/2017 | Bae et al. |
| 2017/0298563 A1 | 10/2017 | Roetker et al. |
| 2017/0341920 A1 | 11/2017 | Gonzales |

FOREIGN PATENT DOCUMENTS

| | | |
|---|---|---|
| DE | 2005011732 | 7/2006 |
| EP | 0454640 | 10/1991 |
| EP | 0682404 | 11/1995 |
| EP | 0945973 | 9/1999 |
| EP | 2329757 | 6/2011 |
| EP | 2508668 A1 | 10/2012 |
| EP | 2620541 | 7/2013 |
| GB | 2288457 A | 10/1995 |
| JP | S57155777 | 9/1982 |
| JP | 2006177330 | 7/2006 |
| JP | 2008259665 | 10/2008 |
| JP | 2009287527 | 12/2009 |
| KR | 1020110125570 | 11/2011 |
| KR | 101588137 | 1/2016 |
| WO | 0346451 | 6/2003 |
| WO | 2004045351 | 6/2004 |
| WO | 20120226555 | 2/2012 |
| WO | 2012072477 | 6/2012 |
| WO | 2012146534 A2 | 11/2012 |
| WO | 2014115976 | 7/2014 |
| WO | 2015010731 | 1/2015 |
| WO | 2016204414 | 12/2016 |
| WO | 2017023122 | 2/2017 |

* cited by examiner

MULTI-OUTLET FLUID FLOW SYSTEM FOR AN APPLIANCE INCORPORATING A BI-DIRECTIONAL MOTOR

BACKGROUND

The device is in the field of fluid systems for appliances. Specifically, the device relates to a fluid flow system having multiple outlets and controlled by a single motor having bi-directional capabilities.

SUMMARY

In at least one aspect, a drain pump for an appliance includes a single, self-starting, single-phase synchronous motor and a pump chamber having an inlet and first and second outlets. The first outlet is a drain outlet and the second outlet is a recirculation outlet. An impeller is disposed within the pump chamber and is selectively and bi-directionally driven by the single-phase synchronous motor. Rotation of the impeller in a first direction directs fluid from the inlet toward the drain outlet and away from the recirculation outlet. Rotation of the impeller in the second direction directs the fluid from the inlet toward the recirculation outlet and away from the drain outlet.

In at least another aspect, a bi-directional, self-starting, single-phase synchronous motor for a drain pump of an appliance includes a stator and a rotor disposed in magnetic communication with the stator. The rotor is operable to start only in a torque-favorable direction from a rest position. The rotor is operable to start in the torque-unfavorable direction from a magnetic potential position. The magnetic potential position is rotationally distal from the rest position in the torque-favorable direction.

In at least another aspect, a fluid-flow system for an appliance includes a motor having a rotor in magnetic communication with a stator. The rotor is operable relative to the stator in first and second rotational directions. An impeller is coupled to the rotor via a drive shaft, and the impeller rotates within a pump chamber in the first and second rotational directions. An inlet is in communication with the pump chamber, and the impeller directs fluid from the inlet and through the pump chamber in each of the first and second rotational directions. First and second outlets are in selective communication with the inlet. The first rotational direction of the impeller directs the fluid from the inlet and through the first outlet. The second rotational direction of the impeller directs the fluid from the inlet and through the second outlet.

These and other features, advantages, and objects of the present device will be further understood and appreciated by those skilled in the art upon studying the following specification, claims, and appended drawings.

DETAILED DESCRIPTION OF EMBODIMENTS

Figure 1:
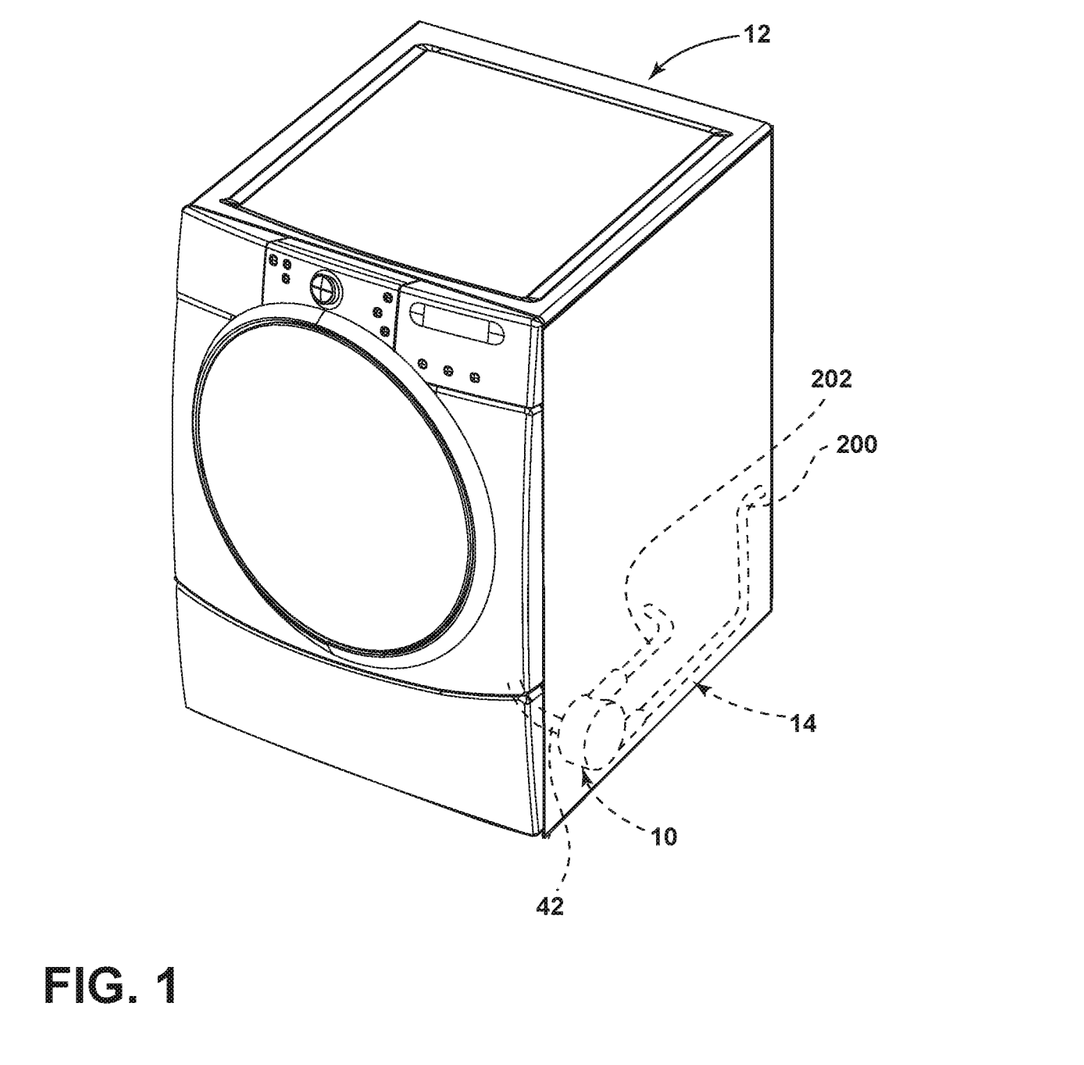
FIG. 1 is a front perspective view of a laundry appliance incorporating an aspect of the multi-outlet drain pump.
Figure 2:
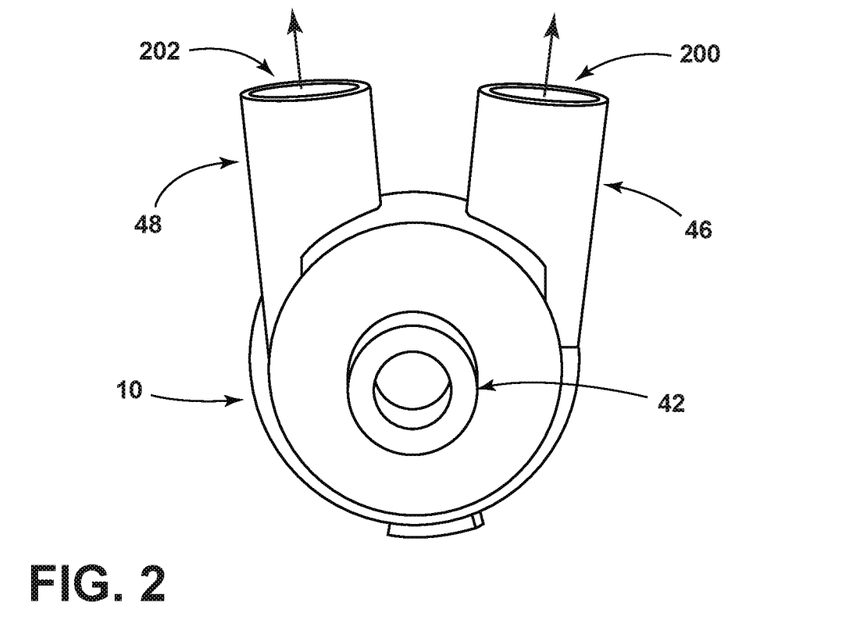
FIG. 2 is a side perspective view of an aspect of the multi-outlet drain pump for an appliance.
Figure 3:
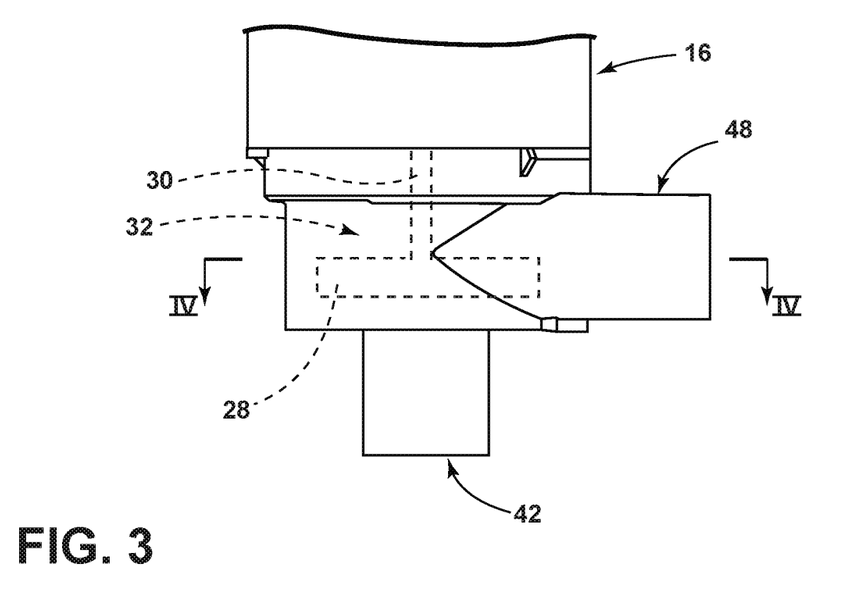
FIG. 3 is a side elevational view of the multi-outlet drain pump of FIG. 2.
Figure 4:
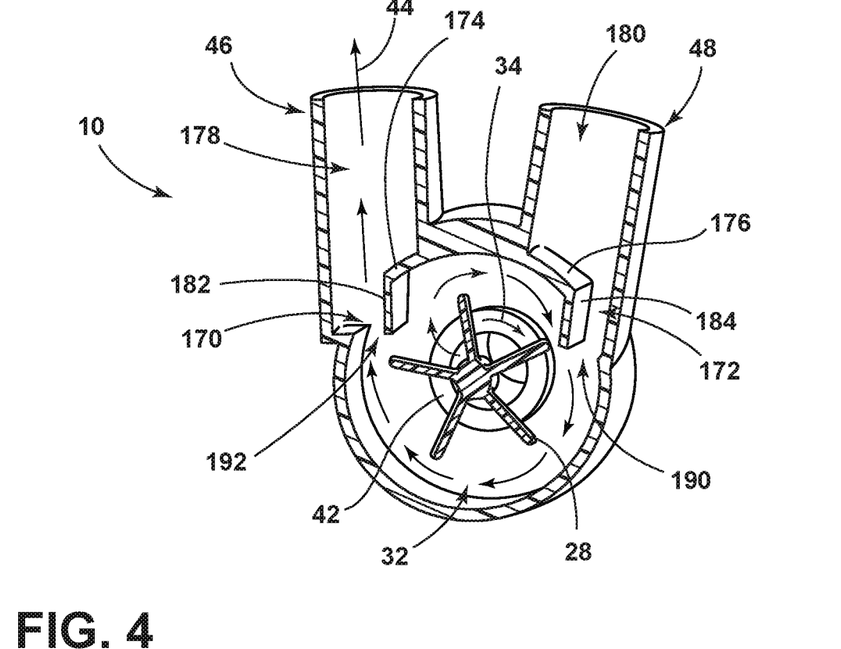
FIG. 4 is a cross-sectional view of the multi-outlet drain pump of FIG. 3 taken along line IV-IV with the impeller operating in a first direction.
Figure 5:
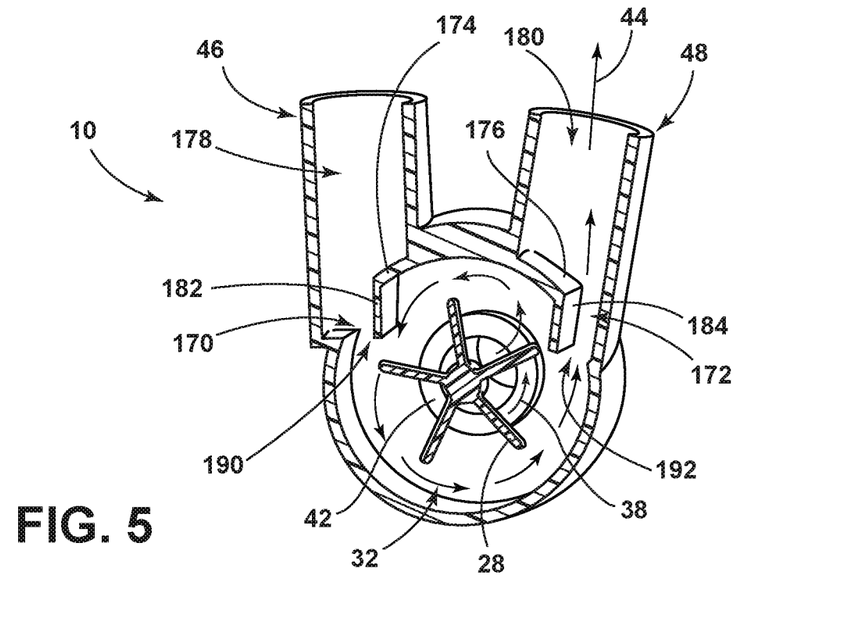
FIG. 5 is a cross-sectional view of the multi-outlet drain pump of FIG. 4 showing the impeller operating in a second direction.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-9, reference numeral 10 generally refers to a multi-outlet drain pump for an appliance 12, such as a laundry appliance. According to the various embodiments, the multi-outlet drain pump 10 can be a component of a fluid-flow system 14, such as a drain system, for the appliance 12. The fluid-flow system 14 for the appliance 12 can include a single-phase synchronous motor 16 having a stator 18, wherein an electrical current 20 applied to the stator 18 selectively defines a first stator-flux polarity 22 and an opposing second stator-flux polarity 24 of the stator 18. A rotor 26 is disposed proximate the stator 18 and is in magnetic communication with the stator 18. An impeller 28 of the multi-outlet drain pump 10 is coupled to the rotor 26 via a drive shaft 30. The impeller 28 selectively and alternatively rotates within a pump chamber 32 in a first direction 34 that corresponds to a torque-favorable direction 36 of the rotor 26 and a second direction 38 that corresponds to a torque-unfavorable direction 40 of the rotor 26. An inlet 42 of the multi-outlet drain pump 10 is in communication with the pump chamber 32. Operation of the impeller 28 directs fluid 44 from the inlet 42 and through the pump chamber 32 when the impeller 28 operates in either of the first and second directions 34, 38. The multi-outlet drain pump 10 also includes first and second outlets 46, 48 that are in alternative communication with the inlet 42. Rotation of the impeller 28 in the first direction 34 serves to direct fluid 44 from the inlet 42 toward the first outlet 46 and away from the second outlet 48. Alternatively, rotation of the impeller 28 in the second direction 38 serves to direct fluid 44 from the inlet 42 and toward the second outlet 48 and away from the first outlet 46. According to the various embodiments, the impeller 28, and in turn, the rotor 26, are configured to begin rotation in the first direction 34 from a rest position 50 of the rotor 26 when the current defines the first stator-flux polarity 22. It is contemplated that the impeller 28 and the rotor 26 are unable to begin rotation in a torque-unfavorable direction 40 or substantially free of beginning rotation in a torque-unfavorable direction 40 from the rest position 50 of the rotor 26 when the electrical current 20 defines the opposing second stator-flux polarity 24. It is contemplated that the impeller 28 is operable to begin rotation in a torque-unfavorable direction 40 from a magnetic potential position 52 of the rotor 26 when the electrical current 20 defines the opposing second stator-flux polarity 24. The magnetic potential position 52 of the rotor 26 is defined by a rotationally different position than that of the rest position 50 of the rotor 26, as will be described more fully below.

Referring again to FIGS. 2-9, a single-phase synchronous motor 16 includes a winding 60 that forms a portion of the stator 18. The winding 60 can be energized through an electrical current 20 to define the first stator-flux polarity 22 and the opposing second stator-flux polarity 24, where the opposing second stator-flux polarity 24 is opposite the first stator-flux polarity 22. The first stator-flux polarity 22 defines a magnetic field having a magnetic north 62 and a magnetic south 64. The opposing second stator-flux polarity 24, alternatively, includes a magnetic north 62 and a magnetic south 64 that are switched 180 degrees with respect to the first stator-flux polarity 22. The rotor 26 includes a magnet 66 that includes a rotor north pole 68 and a rotor south pole 70 that rotate in response to the winding 60 being energized to define the first or second stator-flux polarity 22, 24, wherein the rotor 26 operates to align with the magnetic configuration of the winding 60 of the stator 18.

Figure 6:
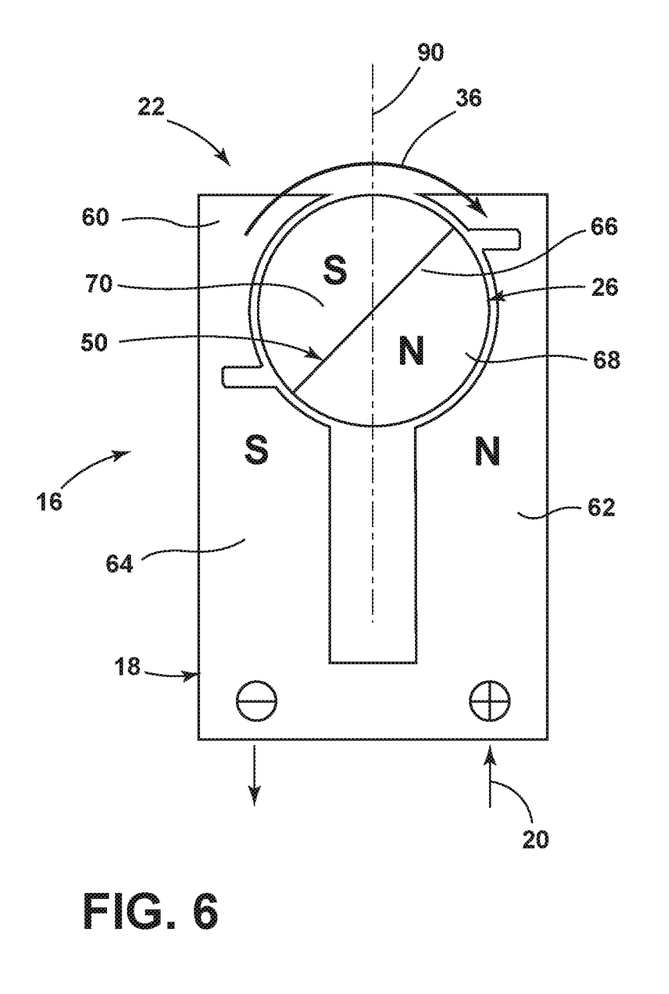
FIG. 6 is a schematic view of an aspect of a bi-directional single-phase synchronous motor incorporated within the multi-outlet drain pump and illustrating rotation of the rotor in a torque-favorable direction.
Figure 7:
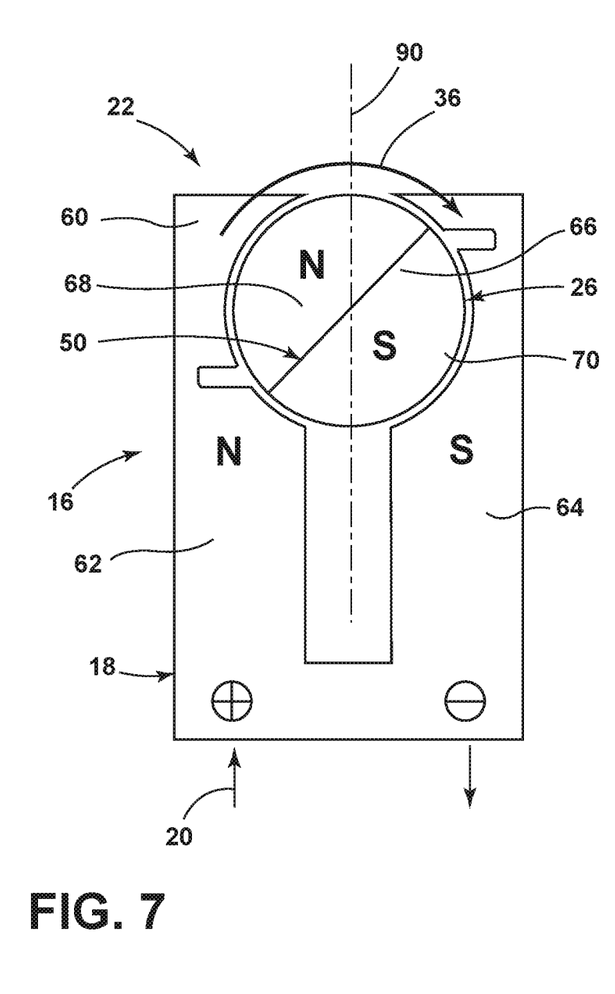
FIG. 7 is a schematic view of the bi-directional single-phase synchronous motor of FIG. 6 illustrating an aspect of rotation of the rotor in a torque-favorable direction.
Figure 8:
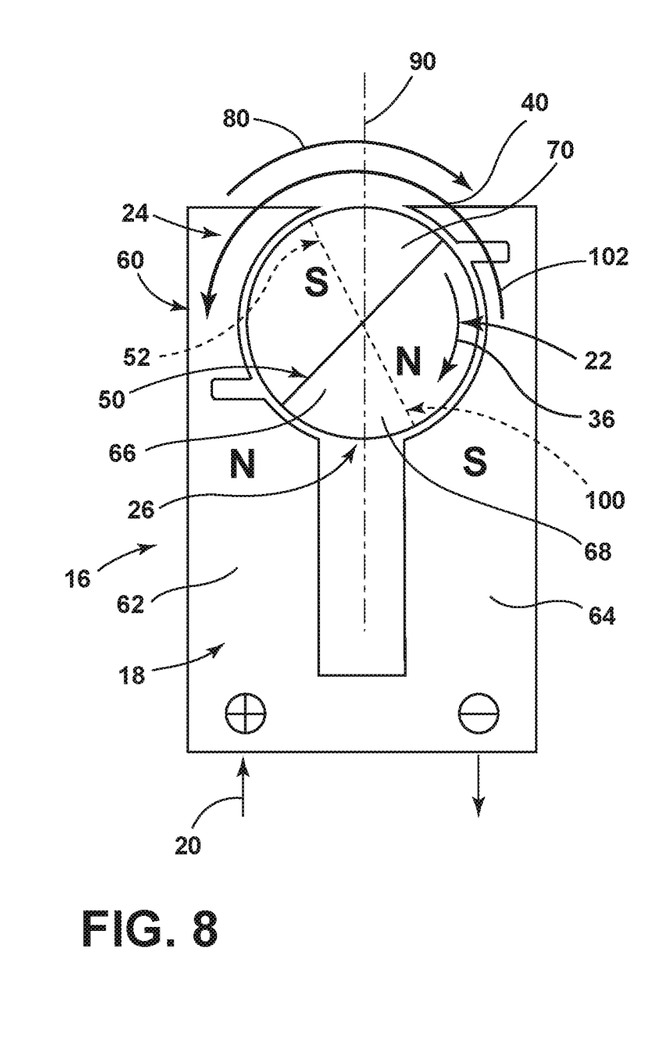
FIG. 8 is a schematic diagram of the bi-directional single phase synchronous motor of FIG. 6 showing rotation of the rotor in a torque-unfavorable direction.
Figure 9:
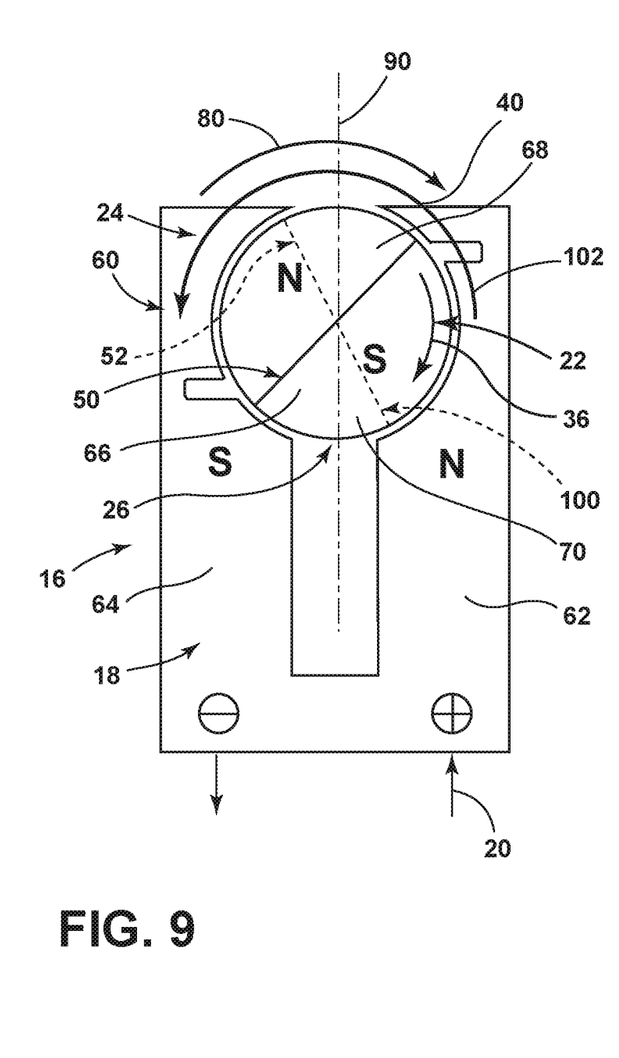
FIG. 9 is a schematic diagram of the bi-directional single-phase synchronous motor of FIG. 8 showing an aspect of operation of the rotor in a torque-unfavorable direction.

As described and illustrated herein, the first stator-flux polarity 22 is a configuration of magnetic north 62 and magnetic south 64 within the winding 60 that will cause a rotation of the rotor 26 in the torque-favorable direction 36. Accordingly, while FIGS. 6 and 7 show opposite orientations of magnetic north 62 and magnetic south 64 of the winding 60, each configuration, based upon the orientation of the rotor 26, will cause the rotor 26 to operate in the torque-favorable direction 36. The opposing second stator-flux polarity 24, as described and illustrated herein, is an opposite polarity to that of the first stator-flux polarity 22, irrespective of the orientation of the magnetic north 62 and magnetic south 64 of the winding 60.

Referring again to FIGS. 2-9 and 11, the rest position 50 of the rotor 26 is oriented such that the rotor north and rotor south poles 68, 70 of the rotor 26 are misaligned with the orientation of the magnetic north and south 62, 64 of the first and second stator-flux polarity 22, 24. Typically, the rest position 50 is oriented such that when the winding 60 is energized to define the first stator-flux polarity 22, the rotor 26 rotates in the torque-favorable direction 36. Once the rotor 26 begins rotation in a torque-favorable direction 36, the winding 60 is energized by a switched electrical current 20 to define the opposing second stator-flux polarity 24, such that before the rotor 26 is able to come to rest in alignment with the magnetic north and south 62, 64 of the first stator-flux polarity 22, the second stator-flux polarity 24 causes further rotation of the rotor 26 in the torque-favorable direction 36. The winding 60 of the stator 18 is then continually energized in an alternative fashion to define the first and second polarities 22, 24 to continue the rotation of the rotor 26 in the torque-favorable direction 36. When rotation of the rotor 26 and the impeller 28 in the torque-favorable direction 36 is no longer necessary, the rotor 26 stops rotation and is adapted to come to rest in the rest position 50. Again, the rest position 50 is defined by the rotor 26 being out of alignment with the magnetic north and south 62, 64 of the winding 60 of the stator 18. It is contemplated that the rotation of the rotor 26 can be slowed to place the rotor 26 in the rest position 50 through various stopping mechanisms that can include, but are not limited to, magnetic forces generated by the winding 60, detents, breaking mechanisms, external magnetic forces, combinations thereof, and other similar rotor parking mechanisms.

Referring now to FIGS. 2, 5, 8-9 and 12, when the rotor 26 is in the rest position 50, the rotor 26 experiences a cogging torque 80, exerted in the torque-favorable direction 36, that prevents rotation of the rotor 26 in the torque-unfavorable direction 40 from the rest position 50. When in the rest position 50, energizing the winding 60 of the stator 18 to define the opposing second stator-flux polarity 24 can only generate a very minimal amount of torque that is exerted on the rotor 26 in the torque-unfavorable direction 40. This minimal amount of torque is insufficient to overcome the cogging torque 80 experienced by the rotor 26 when movement in the torque-unfavorable direction 40 is desired.

Referring again to FIGS. 2, 5, 8-9 and 12, in order to operate the rotor 26 in the torque-unfavorable direction 40, the rotor 26 is first moved in the torque-favorable direction 36 toward the magnetic potential position 52. To reach the magnetic potential position 52, the winding 60 of the stator 18 is energized to define the first stator-flux polarity 22, such that the rotor 26 is operated in the torque-favorable direction 36. The rotor 26 moves in the torque-favorable direction 36 a predetermined angular distance until the rotor north and rotor south poles 68, 70 of the rotor 26 are almost in alignment with the magnetic north 62 and magnetic south 64 of the winding 60 of the stator 18 in the first stator-flux polarity 22. Before reaching this aligned position 90, the electrical current 20 provided to the winding 60 is switched to define the second stator-flux polarity 24 within the winding 60. In this manner, the rotor 26 stops rotation, at least instantaneously, to define the magnetic potential position 52 of the rotor 26. As a result, starting from the magnetic potential position 52, the rotor 26 has built-up magnetic potential energy 100. As the rotor 26 rotates in the torque-unfavorable direction 40 back toward the rest position 50, the built-up magnetic potential energy 100 is released to generate a heightened torque 102. The heightened torque 102 generated by the rotor 26 as it rotates in the torque-unfavorable direction 40 from the magnetic potential position 52, is sufficient to overcome the cogging torque 80 and allows the rotor 26 to rotate in the torque-unfavorable direction 40 through the rest position 50. Once the rotor 26 overcomes the cogging torque 80, the winding 60 of the stator 18 is energized with alternative electrical current 20 to sequentially and alternately define the first and second polarities 22, 24. This switching of polarities in the winding 60 continues the operation of the rotor 26 in the torque-unfavorable direction 40.

According to the various embodiments, as exemplified in FIGS. 1-12, the rotor 26 and windings 60 that are rotated through the sequenced generation of the first and second polarities 22, 24 allows the single-phase synchronous motor 16 to be self-starting in both the torque-favorable and torque-unfavorable directions 36, 40 of the rotor 26. Typically, the magnetic potential position 52 of the rotor 26 is less than 180 degrees from the rest position 50 of the rotor 26. More specifically, the magnetic potential position 52 of the rotor 26 is defined between the rest position 50 and an aligned position 90 of the rotor 26 when the rotor north and rotor south poles 68, 70 of the rotor 26 align with the magnetic north 62 and magnetic south 64 of the windings 60 of the stator 18.

In conventional synchronous motors having a single phase and that are self-starting by parking a rotor 26 in a misaligned position with that of the winding 60 of the stator 18, a single direction of rotation in the torque-favorable direction 36 is all that is possible. Accordingly, in conventional appliances 12 where synchronous motors having a single phase are used, and bi-directional operation of a drain pump 10 is necessary, two synchronous motors having a single phase are used to generate the bi-directional rotation of the impeller 28 for a conventional pump.

The use of the magnetic potential position 52 of the rotor 26 to start operation of the rotor 26 in the torque-unfavorable direction 40 overcomes this limitation of conventional pumps and conventional synchronous motors having a single phase such that only one self-starting single-phase synchronous motor 16, as described herein, is necessary for generating the bi-directional rotation of the impeller 28 for the multi-outlet drain pump 10 disclosed herein.

Figure 10:
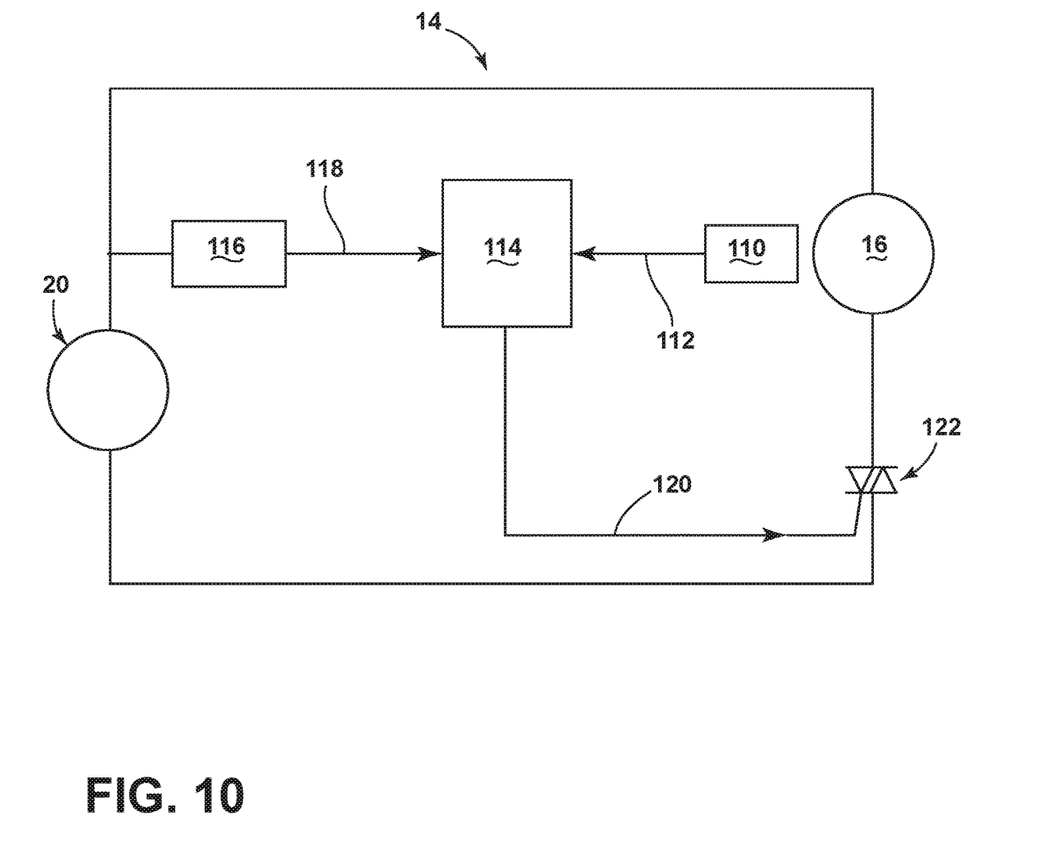
FIG. 10 is a schematic diagram of the operational components of the bi-directional single-phase synchronous motor.
Figure 11:
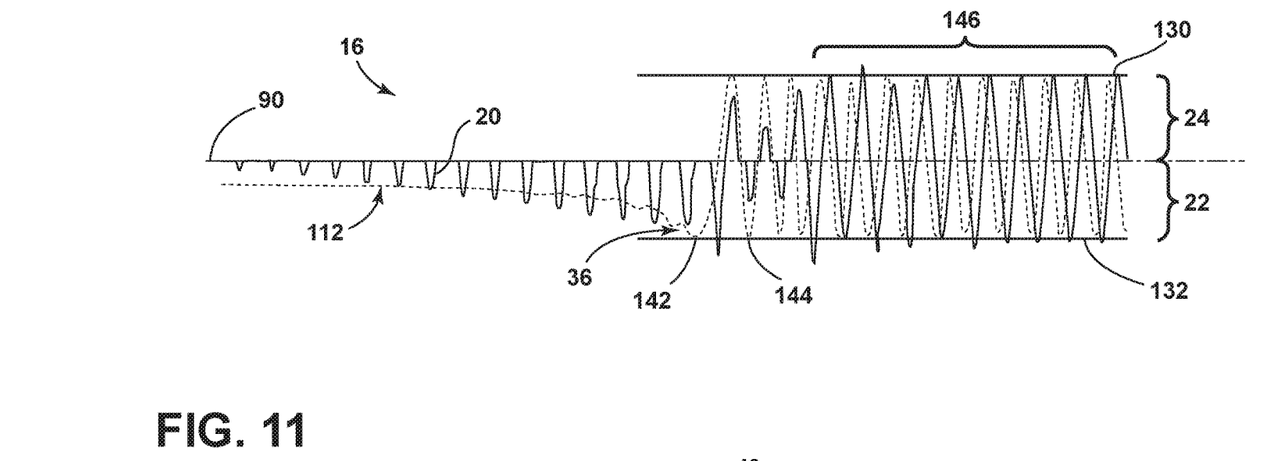
FIG. 11 is a graphical illustration showing operation of the bi-directional single phase synchronous motor in a torque-favorable direction.
Figure 12:
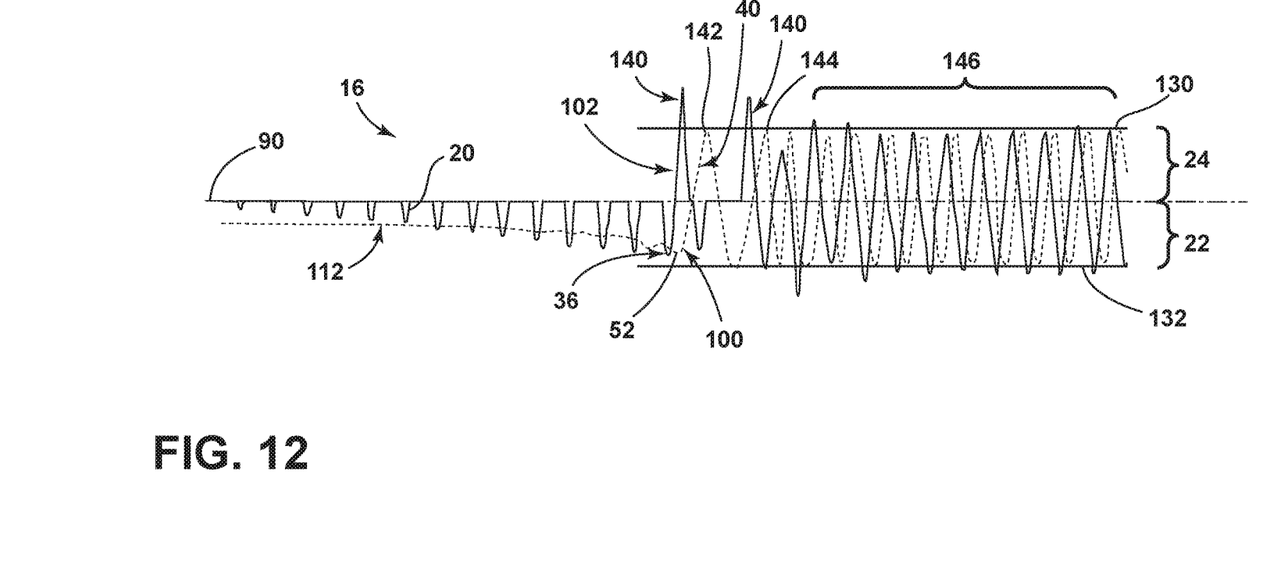
FIG. 12 is a graphical illustration of the operation of the bi-directional single phase synchronous motor in the torque-unfavorable direction.
Figure 13:
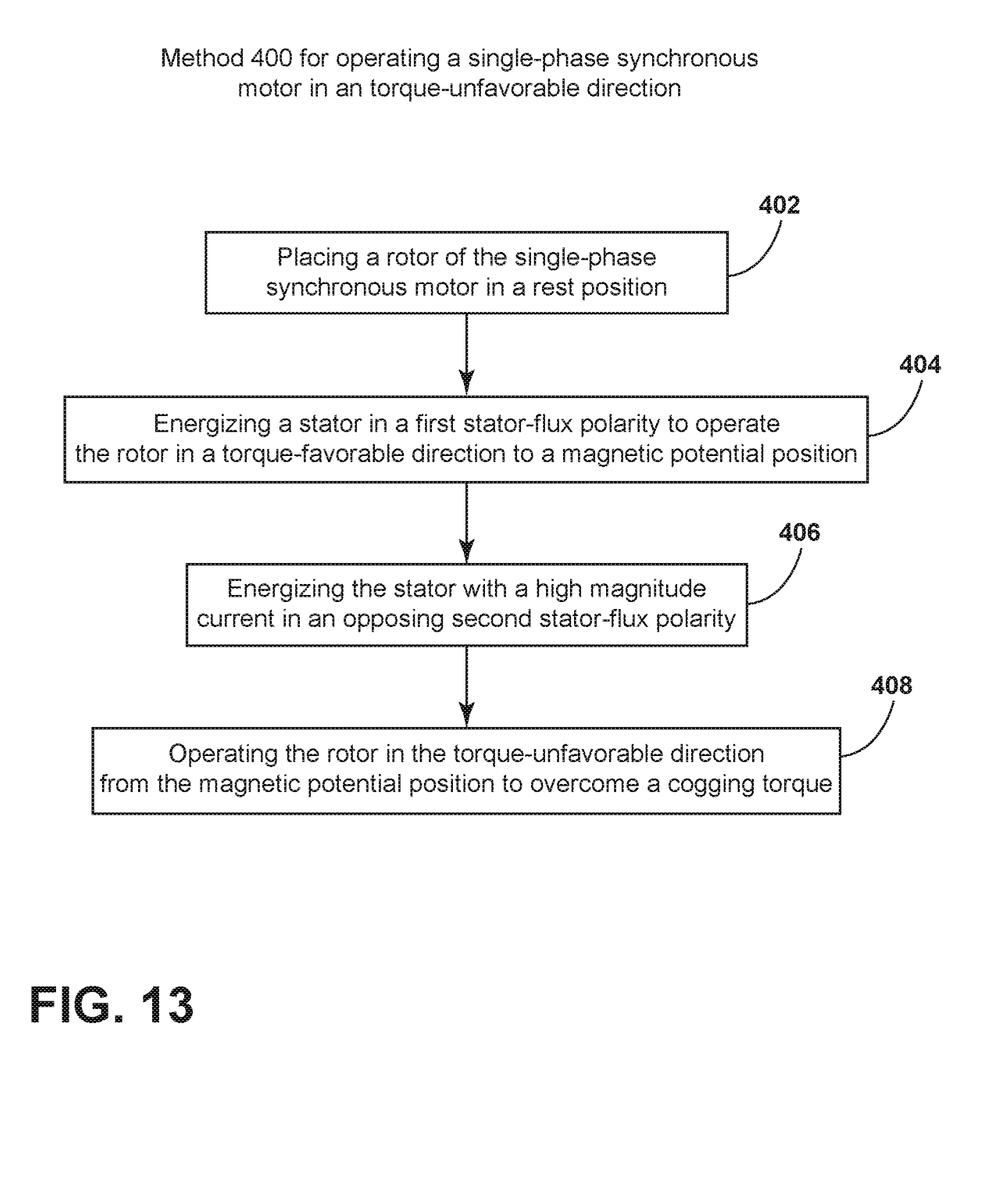
FIG. 13 is a schematic flow diagram illustrating a method for operating a bi-directional single phase synchronous motor in a torque-unfavorable direction.

Referring now to FIGS. 10-12, the single phase synchronous motor includes a Hall sensor 110 that is mounted thereto to provide a rotor position feedback 112 to a micro-controller 114 of the fluid-flow system 14. A zero-crossing detector is in communication with the micro-controller 114 for providing information concerning the AC (alternating current) power polarity 118 defined within the winding 60. Based upon information gathered by the zero-crossing indicator 116 and the Hall sensor 110, the micro-controller 114 generates a TRIAC (triode for alternating current) trigger signal 120 to a TRIAC controller 122 that regulates the polarity and magnitude of the electrical current 20 supplied to the winding 60 of the stator 18 for the single-phase synchronous motor 16. This configuration sequentially defines the first and second polarities 22, 24 as needed to operate the rotor 26 in the torque-favorable and torque-unfavorable directions 36, 40.

As exemplified in FIG. 11, illustrating operation of the single-phase synchronous motor 16 in the torque-favorable direction 36, the winding 60 of the stator 18 is energized in the first stator-flux polarity 22 to operate the rotor 26 in the torque-favorable direction 36. The energizing electrical current 20 provided to the winding 60 of the stator 18 is switched after the rotor 26 reaches and passes through either the maximum or minimum Hall sensor positions 130, 132, which are 180 degrees separated from one another. Because the cogging torque 80 is not present when the rotor 26 operates in the torque-favorable direction 36, the magnitude and sequence of electrical current 20 provided to the winding 60 for generating the first and opposing second polarities 22, 24 can remain substantially minimal and generally consistent. Additionally, the switch between the first and second opposing polarities 22, 24 occurs after the rotor 26 has passed the aligned position 90.

Referring now to FIG. 12, when the rotor 26 is operated in the torque-unfavorable direction 40, the rotor 26 is first operated in the torque-favorable direction 36 to cause a swing in the rotor 26 toward the magnetic potential position 52. Once the rotor 26 is at the magnetic potential position 52, a high magnitude current 140 is applied to the winding 60 of the stator 18 to provide a high intensity magnetic field that exerts the heightened torque 102 on the rotor 26 in the torque-unfavorable direction 40 to build up sufficient momentum to overcome the cogging torque 80. This buildup of momentum to generate the heightened torque 102 allows the rotor 26 to complete at least a first rotation 142 of the rotor 26 in the torque-unfavorable direction 40. It is contemplated that the second rotation 144 of the rotor 26 in the torque-unfavorable direction 40 can also be assisted through a high magnitude current 140 within the winding 60 of the stator 18 to define a second stator-flux polarity 24, where the high magnitude current 140 again exerts the heightened torque 102 on the rotor 26 to power through the cogging torque 80 and increase the speed of the rotor 26 in the torque-unfavorable direction 40 to complete the second rotation 144. Subsequent high magnitude currents 140 may be necessary to allow the rotor 26 to complete additional rotations in the torque-unfavorable direction 40 and achieve a predetermined angular speed 146. Once the rotor 26 achieves this predetermined angular speed 146 in the torque-unfavorable direction 40, the magnitude of the electrical current 20 applied to the winding 60 of the stator 18 to define the first and second opposing polarities 22, 24 is substantially similar to that of the operation of the rotor 26 in the torque-favorable direction 36. As the rotor 26 operates in a torque-unfavorable direction 40, the switch in the electrical current 20 provided to the winding 60 of the stator 18 to define the first and second polarities 22, 24 occurs before the rotor 26 reaches the aligned position 90. In this manner, the switch in the winding 60 of the stator 18 between the first and second polarities 22, 24 serves to "push" the rotor 26 through the aligned position 90 and through the cogging torque 80 experienced by the rotor 26 when operating in a torque-unfavorable direction 40. When rotation of the rotor 26 in the torque-unfavorable direction 40 is no longer desired, braking mechanisms similar to those described above may be implemented to return the rotor 26 to the rest position 50. It is contemplated that an external braking mechanism may be used to slow the rotor 26 so the cogging torque 80 exerted upon the rotor 26 in the torque-unfavorable direction 40 does not cause unnecessary jerking or sudden stopping as the rotor 26 decelerates in the torque-unfavorable direction 40.

Referring now to FIGS. 2-5, the multi-outlet drain pump 10 for the fluid-flow system 14 is coupled with the motor, such as the single-phase synchronous motor 16 described herein, where the motor includes a rotor 26 that is in magnetic communication with the stator 18. As discussed above, the rotor 26 is operable relative to the stator 18 in first and second directions 34, 38. The impeller 28 of the multi-outlet drain pump 10 is coupled to the rotor 26 via the drive shaft 30. It is contemplated that the impeller 28 can rotate within the pump chamber 32 in the first and second directions 34, 38. The inlet 42 is in communication with the pump chamber 32, wherein the impeller 28 directs fluid 44 from the inlet 42 and through the pump chamber 32 as the impeller 28 rotates in each of the first and second directions 34, 38. The first outlet 46 is in selective communication with the inlet 42, wherein rotation of the impeller 28 in the first direction 34 directs fluid 44 from the inlet 42 and through a first outlet restricted opening 170 of the first outlet 46. A second outlet 48 is in selective communication with the inlet 42, where rotation of the impeller 28 in the second direction 38 directs fluid 44 from the inlet 42 and through a second outlet restricted opening 172 of the second outlet 48. It is contemplated that the first outlet restricted opening 170 directs fluid 44 away from the first outlet 46 during rotation of the impeller 28 in the second direction 38. The second outlet restricted opening 172 directs fluid 44 away from the second outlet 48 during rotation of the impeller 28 in the first direction 34.

Referring again to FIGS. 2-5, the first and second outlet restricted openings 170, 172 can include first and second walls 174, 176, respectively. The first wall 174 is configured to partially cover a first outlet passage 178 between the pump chamber 32 and the first outlet 46. Similarly, the second wall 176 partially covers a second outlet passage 180 between the pump chamber 32 and the second outlet 48. According to the various embodiments, the first wall 174 includes a first wing wall 182 that extends from a central portion of the first outlet passage 178 and into the pump chamber 32. The second wall 176 includes a second wing wall 184 that extends from a central portion of a second outlet passage 180 and into the pump chamber 32.

Referring again to FIGS. 2-5, the configuration of the first wall 174 and the first wing wall 182 and the second wall 176 and the second wing wall 184, respectively, causes an inward pressure region 190 toward the pump chamber 32 and an outward pressure region 192 away from the pump chamber 32, in alternative configurations proximate the first and second outlet 46, 48 during operation of the impeller 28. Accordingly, as the impeller 28 operates in the first direction 34, the second wall 176 and second wing wall 184 define an inward pressure region 190 proximate the second outlet 48 such that pressure is exerted toward the pump chamber 32 and no fluid 44 is drained out of the second outlet 48. Conversely, where the impeller 28 operates in the second direction 38, the first wall 174 and the first wing wall 182 define the inward pressure region 190 within the first outlet 46 such that fluid 44 is not drained out of the first outlet 46. It is also contemplated that during operation of the impeller 28 in the first direction 34, an outward pressure region 192 is generated by the impeller 28 in cooperation with the first wall 174 and the first wing wall 182 to create the outward pressure region 192 away from the pump chamber 32 and within the first outlet 46 such that fluid 44 is moved through the first outlet 46 and out of the multi-outlet drain pump 10. Conversely, when the impeller 28 operates in the second direction 38, the outward pressure region 192 is generated through operation of the impeller 28 in the second direction 38 in cooperation with the configuration of the second wall 176 and the second wing wall 184. Accordingly, fluid 44 flows outward from the pump chamber 32 and through the second outlet 48. It is contemplated that the first and second walls 174, 176 can be concentric with an outer wall of the pump chamber 32 to form a substantially continuous cylinder within which fluid 44 can flow during operation of the impeller 28. The first and second wing walls 182, 184 then extend into the pump chamber 32 to assist in the definition of the inward and outward pressure regions 190, 192 of the drain pump 10 during operation of the impeller 28.

According to the various embodiments, the first and second outlets 46, 48 of the multi-outlet drain pump 10 can correspond to a drain outlet 200 where fluid 44 is moved to a drain for expulsion from an appliance 12. The other of the first and second outlets 46, 48 can be defined as a recirculation outlet 202, where fluid 44 is circulated back into a portion of the appliance 12 for reuse during an ongoing or subsequent function of the appliance 12. By way of example, and not limitation, the drain outlet 200 may typically be used where the fluid 44 being moved through the drain pump 10 includes detergent, soiled fluid 44 and other material from the appliance 12 that is produced during a wash cycle. The recirculation outlet 202 may typically be implemented during a rinse/spin cycle where the water may contain far less detergent and/or solid material and may be conveniently reused within the appliance 12. It is contemplated that other configurations of the first and second outlets 46, 48 are possible.

Referring again to FIGS. 2-9, when the impeller 28 is coupled with the single-phase synchronous motor 16 described herein, operation of the impeller 28 in the second direction 38 can correspond to operation of the rotor 26 in the torque-unfavorable direction 40. Accordingly, the impeller 28, before moving in the second direction 38, can operate in the first direction 34 until such time as the rotor 26 is placed in the magnetic potential position 52, with respect to the stator 18. Once in the magnetic potential position 52, the impeller 28 and the rotor 26 will each operate in the torque-unfavorable direction 40 which corresponds to the second direction 38 of the impeller 28.

Referring now to FIGS. 1-13, having described various aspects of the fluid-flow system 14 for the appliance 12 incorporating the bi-directional single-phase synchronous motor 16, a method 400 is disclosed for operating a single-phase synchronous motor 16 in a torque-unfavorable direction 40. According to method 400, a rotor 26 for the single-phase synchronous motor 16 is placed in the rest position 50 with respect to the stator 18 (step 402). The stator 18 is then energized in a first stator-flux polarity 22 for operating the rotor 26 in a torque-favorable direction 36 (step 404). Where it is desired for the rotor 26 to operate continuously in the torque-favorable direction 36, the winding 60 of the stator 18 will be switched to define the second stator-flux polarity 24 after the rotor 26 has passed the aligned position 90 of the rotor 26. Conversely, where it is desired for the rotor 26 to be operated in the torque-unfavorable direction 40, the rotor 26 will be moved from the rest position 50 and in the torque-favorable direction 36 until such time as the rotor 26 reaches the magnetic potential position 52 of the rotor 26. Once in the magnetic potential position 52, which is reached before the rotor 26 achieves the aligned position 90 of the rotor 26, the electrical current 20 provided to the winding 60 of the stator 18 is switched to define the second stator-flux polarity 24 (step 406). As a result, the rotor 26 is rotated from the magnetic potential position 52 in the torque-unfavorable direction 40. As discussed above, when the rotor 26 is in the magnetic potential position 52, the electrical current 20 supplied to the winding 60 of the stator 18 to define the second stator-flux polarity 24 has a very high magnitude to generate sufficient magnetic potential energy 100 within the rotor 26 to overcome the cogging torque 80 and allow the rotor 26 to operate in the torque-unfavorable direction 40 (step 408). According to the various embodiments, it is contemplated that multiple bursts of high magnitude current 140 may be supplied to the winding 60 of the stator 18 during subsequent rotations of the rotor 26 in the torque-unfavorable direction 40 to further overcome the cogging torque 80. Once the rotor 26 achieves a predetermined angular speed 146, the rotor 26 achieves enough momentum to overcome the cogging torque 80 without the need for a high magnitude current 140 being supplied to the winding 60 of the stator 18. It is contemplated that a high magnitude current 140 supplied to the winding 60 of the stator 18 creates a greater magnetic force that is exerted upon the rotor 26, in the form of the heightened torque 102, for generating greater speed and greater momentum of the rotor 26 for overcoming the cogging torque 80. The high magnitude current 140 is typically not necessary when the rotor 26 is being operated in a torque-favorable direction 36, as no cogging torque 80 is typically experienced by the rotor 26 when operating in the torque-favorable direction 36. Depending upon the site of the drain pump 10 and/or the amount of the fluid 44 to be processed, a high magnitude current 140 may be used to operate the rotor 26 in the torque-favorable direction 36.

According to the various embodiments, it is contemplated that the bi-directional single-phase synchronous motor 16 attached to the multi-outlet drain pump 10 can be incorporated within any one or more of various appliances 12. Such appliances 12 can include, but are not limited to, refrigerators, dishwashers, vertically and horizontally oriented laundry appliances, garbage disposals, water heaters, plumbing fixtures, various household applications, combinations thereof, and other similar household and commercial uses.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A drain pump for an appliance, the drain pump comprising:
    a single, self-starting, single-phase synchronous motor;
    a pump chamber having an inlet and first and second outlets, wherein the first outlet is a drain outlet and wherein the second outlet is a recirculation outlet; and
    an impeller disposed within the pump chamber and that is selectively and bi-directionally driven by the single-phase synchronous motor, wherein:
        rotation of the impeller in a first direction directs fluid from the inlet toward the drain outlet and away from the recirculation outlet;
        rotation of the impeller in a second direction directs the fluid from the inlet toward the recirculation outlet and away from the drain outlet;
        the impeller begins rotation in the first direction from a rest position of a rotor;
        from the rest position of the rotor, the single-phase synchronous motor is unable to begin rotation of the impeller in the second direction; and
        the impeller is operable to begin rotation in the second direction from a magnetic potential position of the rotor that is different than the rest position of the rotor when bursts of high-magnitude electrical current are delivered to a stator to begin the rotation of the rotor in the second direction, wherein the bursts of high-magnitude electrical current are greater than a current delivered to the stator to begin rotation of the rotor in the first direction.

2. The drain pump of claim 1, wherein the magnetic potential position of the rotor is less than 180 degrees distal from the rest position of the rotor in the first direction.

3. The drain pump of claim 1, wherein:
    the first and second outlets include respective first and second outlet restricted openings;
    the first outlet restricted opening includes a first wall that partially covers a first outlet passage between the pump chamber and the first outlet; and
    the second outlet restricted opening includes a second wall that partially covers a second outlet passage between the pump chamber and the second outlet.

4. The drain pump of claim 3, wherein:
    the first wall includes a first wing that extends from a central portion of the first outlet passage into the pump chamber; and the second wall includes a second wing wall that extends from a central portion of the second outlet passage into the pump chamber.

5. The drain pump of claim 3, wherein the first and second walls are concentric with an outer wall of the pump chamber.

6. A bi-directional, self-starting, single-phase synchronous motor for a drain pump of an appliance, the single-phase synchronous motor comprising:
a stator; and
a rotor disposed in magnetic communication with the stator, wherein:
the rotor is operable to start only in a torque-favorable direction from a rest position;
the rotor is operable to start in a torque-unfavorable direction from a magnetic potential position;
the magnetic potential position is rotationally distal from the rest position in the torque-favorable direction; and
the rotor is operable to begin rotation in the torque-unfavorable direction by delivering a plurality of bursts of high-magnitude electrical current to the stator, wherein the plurality of bursts of high-magnitude electrical current are used to overcome a cogging torque of the rotor, wherein the bursts of high-magnitude electrical current are greater than the electrical current used to rotate the rotor in the torque-favorable direction.

7. The single-phase synchronous motor of claim 6, wherein the magnetic potential position of the rotor is defined by the rotor operating in the torque-favorable direction a predetermined rotational distance of less than 180 degrees from the rest position.

8. The single-phase synchronous motor of claim 6, wherein the rotor is coupled with a drive shaft that extends to an impeller of a drain pump.

9. The single-phase synchronous motor of claim 8, wherein the drain pump includes an inlet and first and second outlets; and wherein:
when the rotor operates in the torque-favorable direction, the impeller directs fluid from the inlet to the first outlet; and
when the rotor operates in the torque-unfavorable direction, the impeller directs fluid from the inlet to the second outlet.

10. The single-phase synchronous motor of claim 6, wherein the rotor is disposed within the stator.

11. The single-phase synchronous motor of claim 6, wherein:
the rest position of the rotor defines a cogging torque that prevents the rotor from starting in the torque-unfavorable direction from the rest position; and
rotation of the rotor in the torque-unfavorable direction from the magnetic potential position overcomes the cogging torque to allow rotation of the rotor in the torque-unfavorable direction.

12. A fluid-flow system for an appliance, the fluid-flow system comprising:
a motor having a rotor in magnetic communication with a stator, wherein the rotor is operable relative to the stator in first and second rotational directions;
an impeller coupled to the rotor via a drive shaft, wherein the impeller rotates within a pump chamber in the first and second rotational directions;
an inlet in communication with the pump chamber, wherein the impeller directs fluid from the inlet and through the pump chamber in each of the first and second rotational directions; and
first and second outlets in selective communication with the inlet, wherein:
the first rotational direction of the impeller directs the fluid from the inlet and through the first outlet;
the second rotational direction of the impeller directs the fluid from the inlet and through the second outlet;
the first and second outlets include first and second walls, respectively, wherein the first and second walls extend concentrically in relation to a rotational axis of the impeller;
the first wall partially covers a first outlet passage between the pump chamber and the first outlet to define an inward pressure region at the first outlet during the second rotational direction of the impeller, wherein the first wall includes a first wing that extends toward the impeller from a central portion of the first outlet passage into the pump chamber; and
the second wall partially covers a second outlet passage between the pump chamber and the second outlet to define the inward pressure region at the second outlet during the first rotational direction of the impeller.

13. The fluid-flow system of claim 12, wherein the second wall includes a second wing wall that extends toward the impeller from a central portion of the second outlet passage into the pump chamber.

14. The fluid-flow system of claim 12, wherein the first outlet is a drain outlet and the second outlet is a recirculation outlet.

15. The fluid-flow system of claim 12, wherein the first and second walls are concentric with an outer wall of the pump chamber.

16. The fluid-flow system of claim 12, wherein the motor is a single self-starting, single-phase synchronous motor that selectively operates the rotor in the first and second rotational directions.

17. The fluid-flow system of claim 16, wherein:
the first directional rotation of the rotor starts from a rest position of the rotor;
the second rotational direction of the rotor must start distal from the rest position; and
the second rotational direction of the rotor starts from a magnetic potential position of the rotor that is a predetermined rotational distance in the first rotational direction from the rest position.

* * * * *